United States Patent
Eastham (10) Patent No.: US 7,330,882 B2
(45) Date of Patent: Feb. 12, 2008

(54) SYSTEMS AND METHODS FOR DISCOVERING AND INTERACTING WITH SERVICES

(75) Inventor: Bryant Eastham, Draper, UT (US)

(73) Assignee: Matsushita Electric Works, Ltd., Salt Lake City, UT (US)

( * ) Notice: Subject to any disclaimer, the term of this patent is extended or adjusted under 35 U.S.C. 154(b) by 0 days.

(21) Appl. No.: 11/320,498

(22) Filed: Dec. 28, 2005

(65) Prior Publication Data

US 2007/0150570 A1    Jun. 28, 2007

(51) Int. Cl.
*G06F 15/173* (2006.01)
(52) U.S. Cl. .................. 709/223; 709/203; 709/219
(58) Field of Classification Search ............... 709/203, 709/219, 218, 220, 230, 206, 223
See application file for complete search history.

(56) References Cited

U.S. PATENT DOCUMENTS 6,876,636 B2    4/2005  Sinnarajah et al.
2002/0107939 A1*   8/2002  Ford et al. .............. 709/218
2003/0097425 A1*   5/2003  Chen ....................... 709/220
2003/0140119 A1*   7/2003  Acharya et al. ......... 709/219
2004/0019636 A1*   1/2004  St. Pierre et al. ....... 709/203
2005/0204042 A1    9/2005  Banerjee et al.
2005/0213525 A1    9/2005  Grayson et al.
2005/0267943 A1*  12/2005  Castaldi et al. ......... 709/206
2006/0168264 A1*   7/2006  Baba et al. ............. 709/230

* cited by examiner

*Primary Examiner*—Jungwon Chang
(74) *Attorney, Agent, or Firm*—Madson & Austin (57) ABSTRACT

A requester multicasts a service command. When a service receives the service command, it performs the operation that is specified by the service command, which may generate response data. The service may then send, and the requestor may receive, a response message via unicast. The response message may include the response data. The response message may also include discovery information about the service, which is information that facilitates discovery of the service by the requestor. The requestor processes the response data and the discovery information. If further interaction with the service is desired, the requester may use the discovery information to establish a connection with the service.

17 Claims, 9 Drawing Sheets

SYSTEMS AND METHODS FOR DISCOVERING AND INTERACTING WITH SERVICES

TECHNICAL FIELD

The present invention relates generally to computers and computer-related technology. More specifically, the present invention relates to systems and methods for discovering and interacting with services.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network. An embedded system may be a network node. Other examples of network nodes include computers, personal digital assistants (PDAs), cell phones, etc.

Some embedded systems may provide data and/or services to other computing devices using a computer network. Many different kinds of services may be provided. Some examples of services include providing temperature data from a location, providing surveillance data, providing weather information, providing an audio stream, providing a video stream, etc. As used herein, the term "requester" refers to a node that requests a service from a provider. The term "provider" refers to a node that provides a service to a requester.

Some of the nodes within a computer network may be configured to send messages to other nodes on the network using multicast technology. Within the context of computer networks, the term "multicasting" refers to the process of sending a message simultaneously to more than one node on the network. Multicasting is different from broadcasting in that multicasting means sending a message to specific groups of nodes within a network, whereas broadcasting implies sending a message to all of the nodes on the network.

Various protocols have been defined for allowing nodes to discover services that are available on a network. Some examples of such protocols include the Service Location Protocol (SLP), Bonjour, etc. Known discovery protocols typically use multicast technology to discover services and information about how to interact with them.

With known approaches, the process of discovering a service is separate from the process of interacting with the service. Protocols such as SLP and Bonjour provide mechanisms for discovering services, but not for interacting with them. Once a service has been discovered, an entirely different protocol (e.g., SOAP) is used to interact with the service. Accordingly, with known approaches, a service requester typically has two protocol stacks for dealing with services, a protocol stack for service discovery and a separate protocol stack for service interaction. However, implementing two separate protocol stacks for services may be difficult for some devices with limited resources (processing capability, memory, etc.), such as some embedded systems.

In view of the foregoing, benefits may be realized by improvements related to discovering and interacting with services on a computer network. Some exemplary systems and methods for facilitating more efficient discovery of services on a computer network are disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Systems and methods for discovering and interacting with services are disclosed. In an exemplary embodiment, a requester multicasts a service command. In response to the service command, the requestor receives response data from at least one service that has not previously been discovered by the requestor. The requestor may also receive discovery information that enables the requestor to interact further with the at least one service. The discovery information for a particular service may enable the requester to establish a connection (e.g., a TCP/IP connection) with a provider of the service. For example, the discovery information for a particular service may be a network address of the provider of the service, and a port on the provider on which the service is available. If further interaction with the service is desired, the requestor may use the discovery information to establish a connection with the provider of the service.

In some embodiments, the response data from a particular service and the discovery information that enables the requestor to interact further with the service may be received simultaneously. For example, the response data may be included within a payload of a packet that is sent from the service, and the discovery information may be included within a transport header of the packet.

The requestor may multicast the service command in accordance with a User Datagram Protocol implementation. The response data and the discovery information may be received via unicast in accordance with a User Datagram Protocol implementation.

The requestor may receive response data from a service that is located on a non-multicast provider. In this situation, the discovery information may enable the requestor to establish a connection to a multicast proxy, which may serve as an interface between the requestor and the non-multicast provider.

The requestor may receive response data from a service that is located on a provider in a network that is separated from the requestor's network by at least one networking device that is not configured to route multicast addressing.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
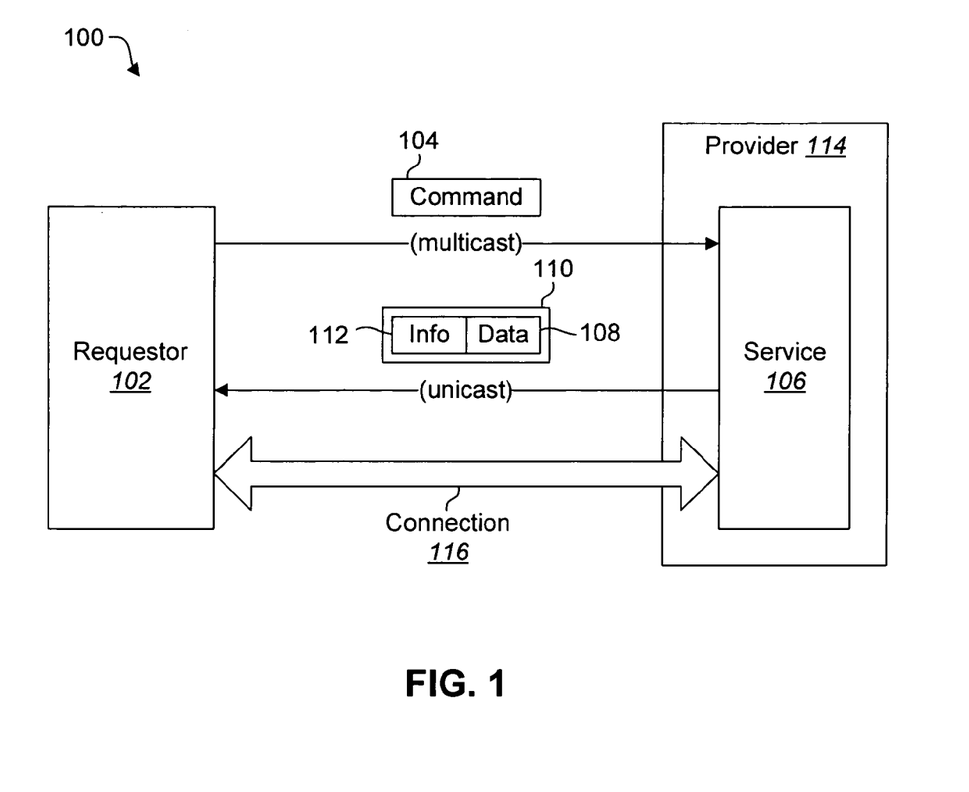
FIG. 1 is a block diagram that illustrates a system for discovering and interacting with services according to an embodiment.

FIG. 1 is a block diagram that illustrates a system 100 for discovering and interacting with services according to an embodiment. A requestor 102 sends a service command 104 via multicast to a multicast group. (As indicated above, the term "requestor" refers to a node that requests a service from a provider.) The service command 104 is an instruction to a service 106 to perform an operation. Examples of service commands 104 include calling a function that is provided by the service 106, reading/setting a variable that is provided by the service 106, etc.

A service 106 that the requestor 102 has not previously discovered is shown in FIG. 1. The service 106 is located on a provider 114. (As indicated above, the term "provider" refers to a node that provides a service to a requestor.) It will be understood that the provider 114 provides the service 106 access to the network, and in fact actually receives the service command 104 and sends the response message 110. This provider 114 has joined the multicast group to which the service command 104 is sent, and is listening on the multicast port that is associated with this multicast group. As a result, the provider 114 receives the service command 104 from the requestor 102 and forwards it to the service 106. The service 106 performs the operation that is specified by the service command 104, which may generate response data 108. For example, if the service command 104 is an instruction to read a variable, then the response data 108 may be the value of the variable. As another example, if the service command 104 is a function call, then the response data 108 may be one or more values that are returned by that function.

After performing the operation that is specified by the service command 104, the provider 114 sends a response message 110 to the requestor 102 via unicast. The response message 110 that is sent includes the response data 108. In addition, the response message 110 also includes discovery information 112 about the service 106 and provider 114. The discovery information 112 is information that facilitates discovery of the service 106 and provider 114 by the requestor 102. (As stated above, the requestor 102 has not yet discovered the service 106 when it multicasts the service command 104.) For example, the discovery information 112 may include information that enables the requestor 102 to establish a connection (e.g., a TCP/IP connection) with the provider 114, such as the network address of the provider 114 and the port on the provider 114 on which the service 106 is available. While the provider 114 actually sends and receives the service command 104 and response message 110, it can be said that they are received and sent by the service 106 as well. Similarly, part of the discovery information 112 relates to the provider 114 and part to the service 106. The discovery information 112 simultaneously discovers both the provider 114 and service 106.

As discussed above, with known approaches the process of discovering a service is separate from the process of interacting with the service. In contrast, in the depicted embodiment the requester 102 simultaneously discovers and interacts with the service 106. The requester 102 receives both the response data 108 and the discovery information 112, simultaneously, in response to multicasting the service command 104. The requestor 102 discovers the service 106 by processing the discovery information 112 for the service 106 (e.g., the network address and port) that is contained within the response message 110. The requestor 102 interacts with the service 106 by processing the response data 108 that is contained within the response message 110.

For simplicity, FIG. 1 illustrates a single service 106 responding to the service command 104 sent by the requestor 102. However, multiple services 106 may respond to the service command 104. The service command 104 may be designed so that each service 106 that receives the service command 104 responds to it. This allows the requestor 102 to discover all of the services 106 within a particular area. For example, if the service command 104 is an instruction to read a printer name variable from a printer service 106, each printer service 106 that receives the service command 104 may return the value of its printer name variable, thereby allowing the requestor 102 to discover all of the available printers within a particular area (e.g., a computer network).

Although it is possible for multiple services 106 to respond to the service command 104, under some circumstances the requestor 102 may not want to discover all of the available services 106 within a particular area. Instead, the requester 102 may simply want to query for a specific service 106, or a specific set of services 106. For example, instead of discovering all of the printers within a particular area, the requestor 102 may want to discover a specific printer service 106 (e.g., so that it can send a print job to a specific printer). Mechanisms for providing this functionality will be discussed below.

Under some circumstances, it may be desirable for the requestor 102 to have additional interaction with a service 106 after a response message 110 is received from that service 106. For example, consider a service 106 that returns the temperature of a device. If the service 106 sends a response message 110 that indicates that the temperature of the device exceeds a certain threshold, then the requestor 102 may be configured to request additional information from that service 106.

If further interaction with a service 106 is desired after a response message 110 from the service 106 is received, the requester 102 may use the discovery information 112 that was received from the service 106 to establish a connection 116 (e.g., a TCP/IP connection) with the provider 114 in order to interact with the service 106. The requestor 102 may then interact further with the service 106 via this connection 116.

In some embodiments, the requestor 102 may use an implementation of the User Datagram Protocol (UDP) as the transport protocol to multicast the service command 104. Also, the service 106 may use UDP as the transport protocol to unicast the response message 110 back to the requestor 102.

Figure 2:
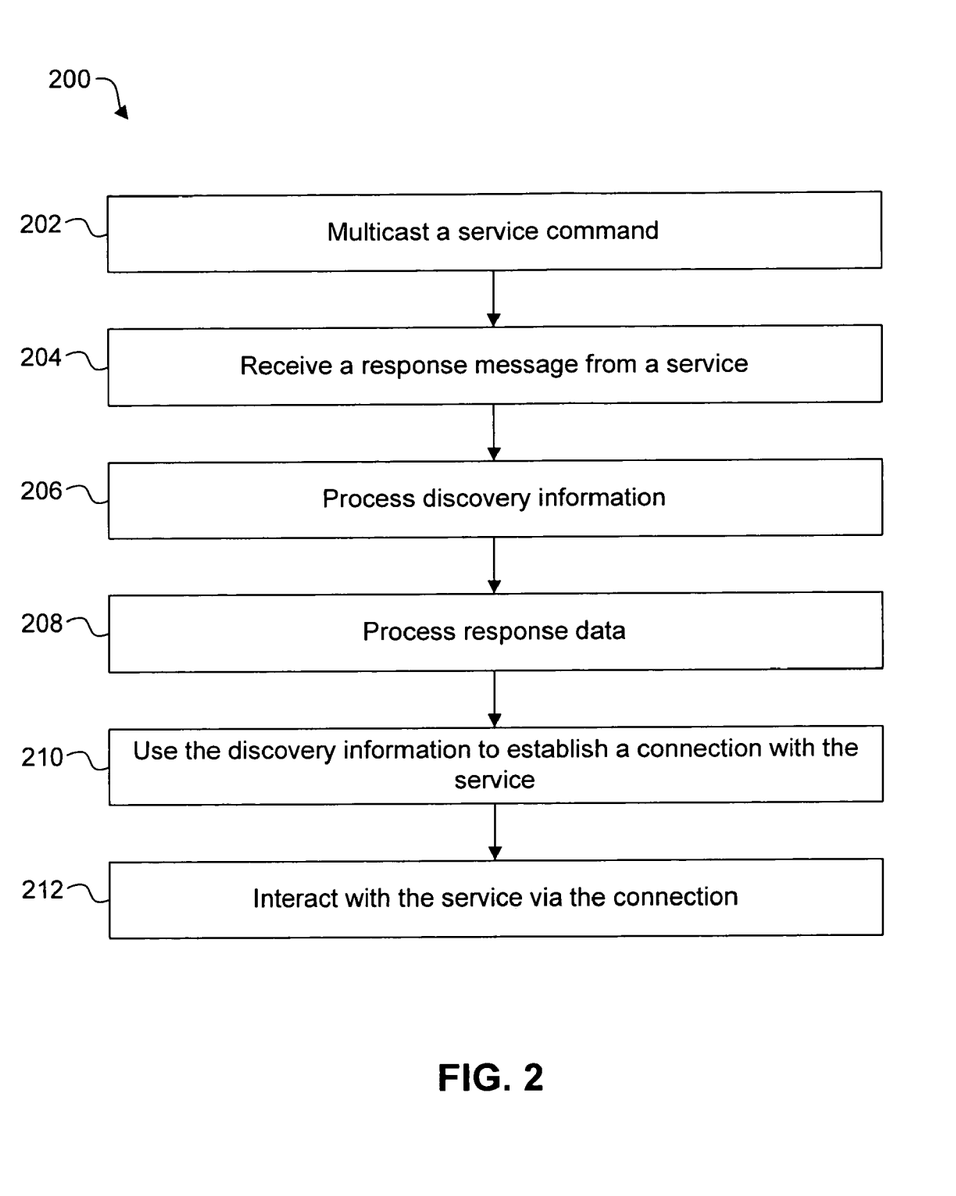
FIG. 2 is a flow diagram that illustrates the operation of the requestor in the embodiment depicted in FIG. 1.

FIG. 2 is a flow diagram that illustrates the operation of the requestor 102 in the embodiment depicted in FIG. 1. The requestor 102 multicasts 202 a service command 104 to a multicast group. At least one service 106 that the requestor 102 has not previously discovered receives and responds to the service command 104 from the requestor 102.

When a service 106 receives the service command 104, it performs the operation that is specified by the service command 104, which may generate response data 108. The service 106 may then send, and the requester 102 may receive 204, a response message 110 via unicast. The response message 110 may include the response data 108. The response message 110 may also include discovery information 112 about the service 106, which is information that facilitates discovery of the service 106 by the requestor 102.

The requestor 102 discovers the service 106 by processing 206 the discovery information 112 for the provider 114 (e.g., the network address and port) contained within the response message 110. The requestor 102 interacts with the service 106 by processing 208 the response data 108 that is contained within the response message 110. Accordingly, by receiving and processing the response message 110, the requestor 102 simultaneously discovers and interacts with the service 106.

If further interaction with a service 106 is desired after a response message 110 from the service 106 is received, the requestor 102 may use the discovery information 112 that was received from the service 106 to establish 210 a connection 116 (e.g., a TCP/IP connection) with the service 106. The requestor 102 may then interact 212 further with the service 106 via this connection 116.

Figure 3:
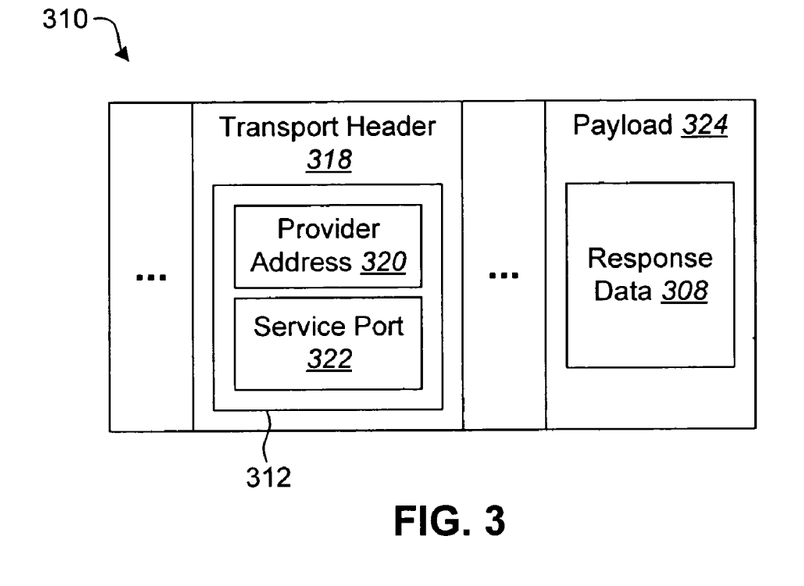
FIG. 3 is a block diagram that illustrates the configuration of a packet comprising the response to a service command according to an embodiment.

FIG. 3 is a block diagram that illustrates the configuration of a packet 310 comprising the response to a service command 104 according to an embodiment. In the depicted embodiment, the transport header 318 of the response packet 310 includes the network address 320 of the provider 114 of the service 106, as well as the port 322 on the provider 114 to which the service 106 is bound. This discovery information 312 is included in the transport header 318 as the response packet 310 is processed by the provider 114 as part of the service 106 requesting that the response packet 310 be sent. Because the discovery information 312 is included in the transport header 318 of the response packet 310, it is not necessary for the discovery information 312 to be included in the payload 324 of the response packet. Consequently, the payload 324 of the response packet 310 may include the response data 308, i.e., the data that the service 106 is sending to the requestor 102 in response to the service command 104.

With known approaches to service discovery, a requestor typically does not interact with a service to discover information about the service. Instead, a separate discovery server may provide information about available services. Moreover, the response to a request for information about available services is typically sent from an ephemeral port, i.e., a port that is temporarily assigned for the purpose of sending the response. Accordingly, the transport header of a response packet that is sent in accordance with known approaches does not provide information about how to establish a connection with the service. In contrast, in the depicted embodiment the discovery information 312 (i.e., the network address 320 and port 322 of the provider 114) is included in the transport header 318 of the response packet 310, leaving additional room for response data 308 in the payload 324 of the response packet 310.

As indicated above, under some circumstances, a requestor may not want to discover all of the available services within a particular area. Instead, a requester may simply want to query for a specific service, or a specific set of services. For example, instead of discovering all of the printers within a network, the requestor may want to discover a specific printer (e.g., so that it can send a print job to it).

To enable requestors to discover a specific service (or set of services) within a particular area, each service within the area may provide a function that returns a value only if one or more conditions are satisfied. This kind of function will be referred to herein as a conditional function.

Figure 4:
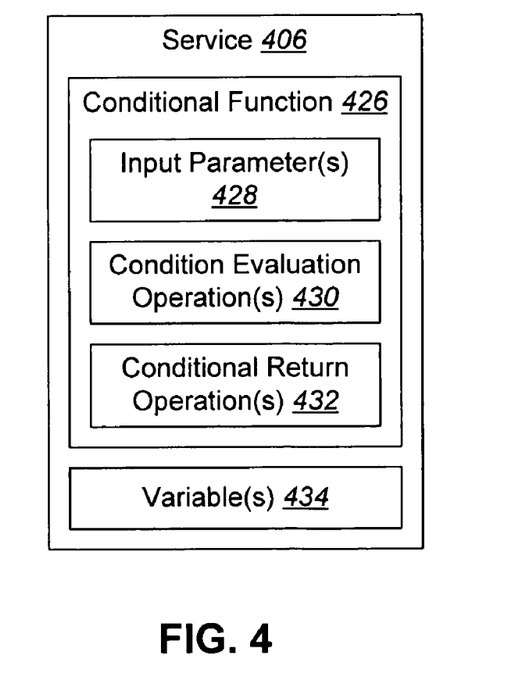
FIG. 4 is a block diagram that illustrates a conditional function that may be implemented by a service according to an embodiment.

FIG. 4 is a block diagram that illustrates a conditional function 426 that may be implemented by a service 406 according to an embodiment. The conditional function 426 includes one or more input parameters 428, one or more condition evaluation operations 430, and one or more conditional return operations 432. The input parameters 428 are values that are provided by a requestor when it calls the conditional function 426. The condition evaluation operations 430 are operations to evaluate whether one or more conditions are satisfied. The condition evaluation operations 430 may involve comparing the input parameters 428 to one or more variables 434 that are maintained by the service 406. The conditional return operations 432 are operations to return values to the calling requestor if the appropriate condition(s) is/are satisfied.

A specific example of the conditional function 426 that is illustrated in FIG. 4 will now be discussed. In this example, suppose that a requestor wants to discover a specific printer within a network. Each printer service within the network may be configured with a conditional function 426 that accepts the name of the desired printer as an input parameter 428. The function 426 performs a condition evaluation operation 430 that involves comparing the name of the desired printer with a printer name variable 434 that is maintained by the service 406. A conditional return operation 432 is then performed. In particular, if the name of the desired printer matches the printer name variable 434, then the function 426 returns a value (e.g., TRUE) to the calling requester. If the name of the desired printer does not match the printer name variable 434, then the function 426 does not return anything to the requester. If a requestor multicasts a call to the conditional function 426 discussed in this example, then only the printer service 406 that corresponds to the desired printer will respond. Accordingly, the requestor is able to discover a specific printer within the network.

The embodiments described above involve the use of multicast technology to discover and interact with services. However, some types of nodes may not be configured to process multicast messages. For example, some nodes may not be capable of receiving and/or processing multicast messages (e.g., they do not have the appropriate multicast protocol stack for processing multicast messages). Also, some nodes that are capable of processing multicast messages may be configured or notified not to process multicast messages, at least temporarily. The term "non-multicast node" will be used herein to refer to a node that does not process multicast messages, either because it is not capable of processing multicast messages or because it has been configured or notified not to process multicast messages. Under some circumstances, a requestor may want to discover and interact with services that are provided by non-multicast nodes.

Figure 5:
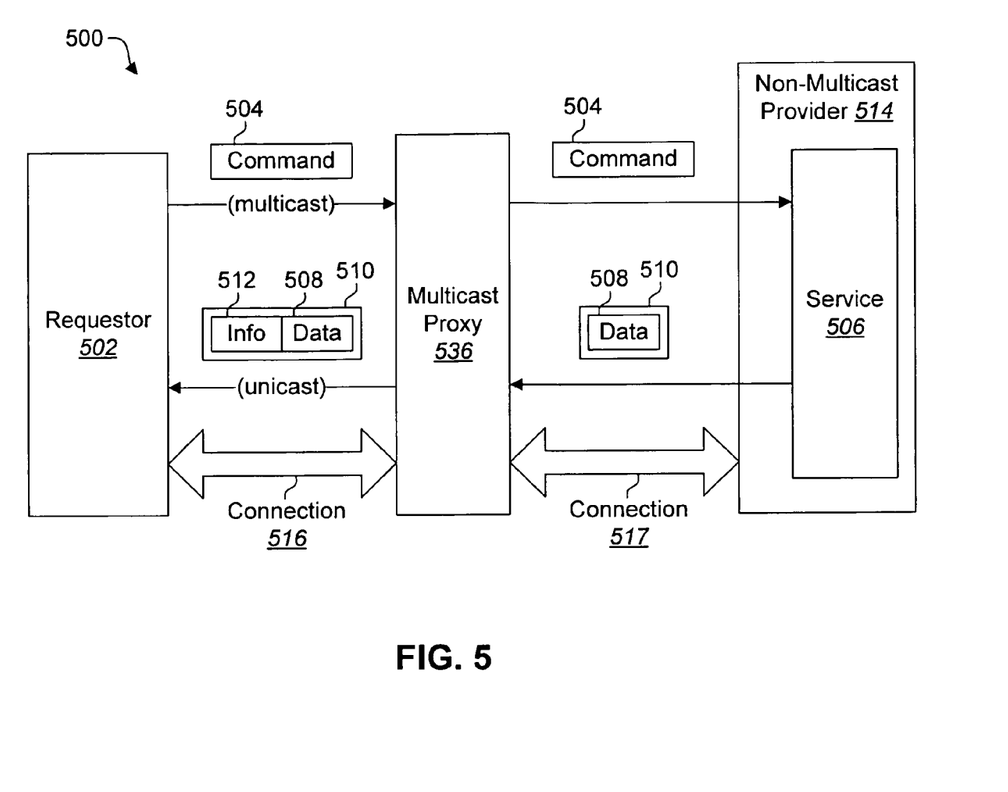
FIG. 5 is a block diagram that illustrates a system for discovering and interacting with services located on non-multicast nodes according to an embodiment.

FIG. 5 is a block diagram that illustrates a system 500 for discovering and interacting with services located on non-multicast nodes according to an embodiment. The system 500 includes a multicast proxy 536. In general terms, the multicast proxy 536 serves as an interface between multicast-capable nodes and non-multicast nodes. Non-multicast nodes register with the multicast proxy 536. The multicast proxy 536 receives multicast messages on behalf of the registered non-multicast nodes, and forwards these messages to the registered non-multicast nodes. Non-multicast nodes may respond to multicast messages via the multicast proxy.

When a requestor 502 sends a service command 504 via multicast to a multicast group that includes the multicast proxy 536, the multicast proxy 536 receives the service command 504 and forwards it to one or more non-multicast nodes that provide the requested service, which will be referred to herein as "non-multicast providers." In the depicted embodiment, there is a connection 517 (e.g., a TCP/IP connection) between the multicast proxy 536 and the non-multicast provider 514. The multicast proxy 536 may transmit the service command 504 to a non-multicast provider 514 via the connection 517. After performing the operation that is specified by the service command 504, the service 506 sends a response message 510, via the connection 517, back to the multicast proxy 536. The response message 510 includes the response data 508, i.e., the data that the service 506 is sending to the requestor 502 in response to the service command 504. The multicast proxy 536 adds its discovery information 512 (i.e., information 512 that facilitates discovery of the multicast proxy 536) to the response message 510 and forwards the response message 510 to the original requestor 502 via unicast.

The process just described allows the requestor 502 to simultaneously discover and interact with a service 506 that is located on a non-multicast provider 514. As discussed above, the requester 502 interacts with the service 506 by processing the response data 508 that is contained within the response message 510. The requestor 502 discovers how to interact further with the service 502 by processing the discovery information 512 for the multicast proxy 536 that is contained within the response message 510. If further interaction with the service 506 is desired, the requestor 502 may use the discovery information 512 to establish a connection 516 with the multicast proxy 536. The requestor 502 may then interact further with the service 506 via the multicast proxy 536.

In some embodiments, the multicast proxy 536 may be a selective multicast proxy that selectively forwards multicast messages that it receives. A selective multicast proxy may be configured so that when it receives a request for a service via multicast, the selective multicast proxy identifies a provider of the requested service and specifically directs the service request to that provider. In other words, the selective multicast proxy forwards the service request only to that provider, and not to other nodes, such as other non-multicast nodes. Additional details about selective multicast proxies are described in copending U.S. patent application Ser. No. 11/305,838, titled "Systems And Methods For Providing A Selective Multicast Proxy On A Computer Network," filed Dec. 16, 2005, with inventors Thomas Milligan and Bryant Eastham. This copending U.S. patent application, which is assigned to the assignee of the present invention, is hereby incorporated by reference in its entirety.

Under some circumstances, a requestor may want to discover and interact with services that are provided by nodes in a separate network. Typically, one or more networking devices (e.g., a router, a firewall, etc.) separate the requestor's network from the provider's network. Some or all of these networking devices may not be configured to route multicast addressing. As discussed above, a requestor initiates the process of discovering and interacting with services by multicasting a service command. Accordingly, to facilitate discovery of and interaction with services in a separate network, some mechanism for bridging multicast traffic across networks may be provided.

Figure 6:
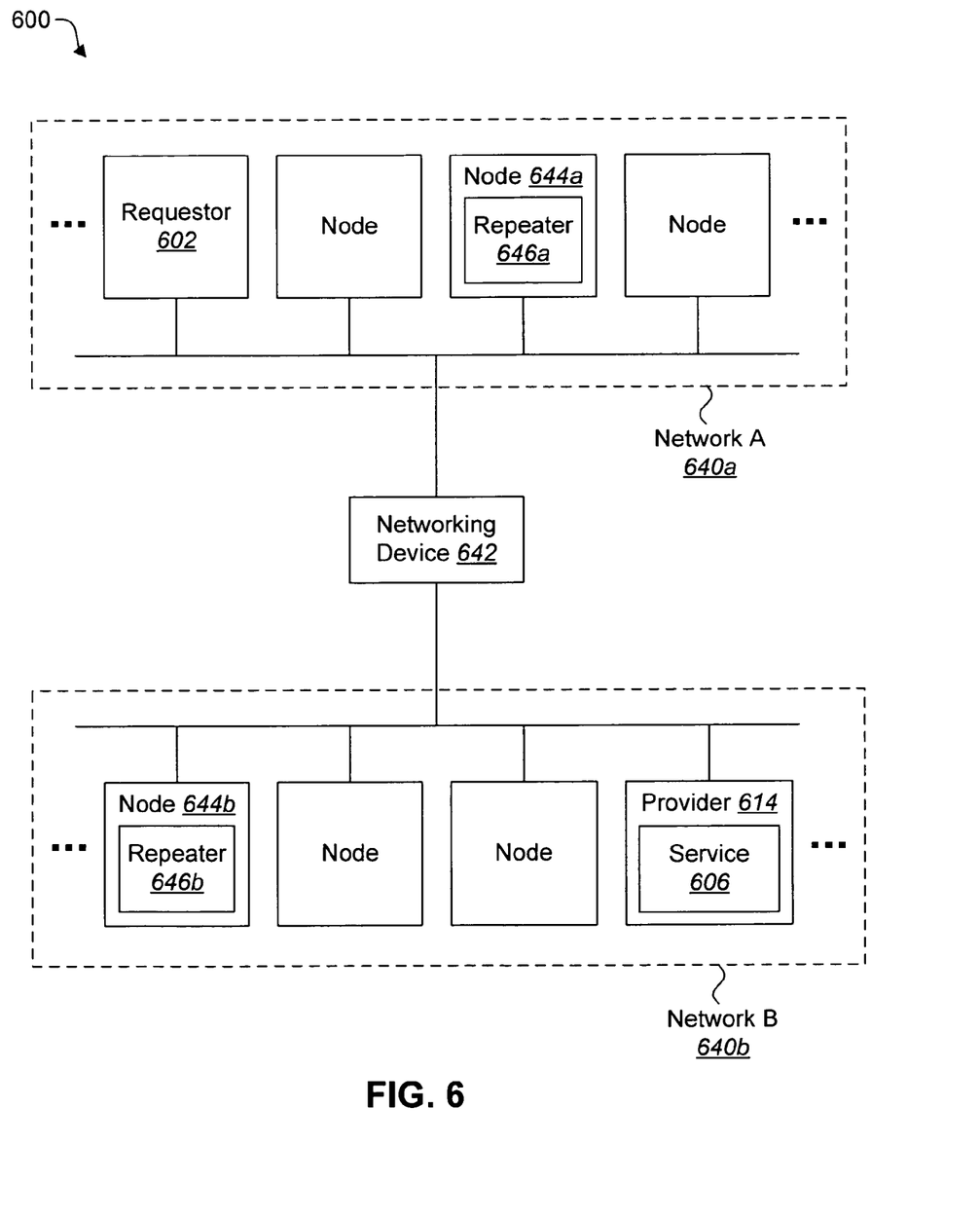
FIG. 6 is a block diagram that illustrates a system for discovering and interacting with services in a separate network according to an embodiment.

FIG. 6 is a block diagram that illustrates a system 600 for discovering and interacting with services in a separate network according to an embodiment. The system 600 includes multiple computer networks 640, namely network A 640a and network B 640b. Each network 640 includes a plurality of interconnected nodes. The networks 640a, 640b are separated by at least one networking device 642 (e.g., a router, firewall, etc.) that is not configured to route multicast addressing.

Each network includes at least one node 644 that includes a multicast repeater 646. More specifically, network A 640a includes a node 644a that includes a multicast repeater 646a, and network B 640b includes a node 644b that includes a multicast repeater 646b. In general terms, a multicast repeater 646 is a network bridge that allows multicast messages that originate on one isolated network (e.g., network A 640a) to be repeated to and responded by nodes on another isolated network (e.g., network B 640b). To accomplish this, each multicast repeater 646 is configured to forward each multicast message that it receives to all other known repeaters 646 (unless the multicast message has already been forwarded). Additional details about the configuration and operation of the multicast repeaters 646a, 646b are provided in U.S. patent application Ser. No. 11/313,282, titled "Systems And Methods For Providing A Network Bridge For UDP Multicast Traffic," filed Dec. 20, 2005, with inventors Thomas Milligan and Bryant Eastham. This U.S. patent application, which is assigned to the assignee of the present invention, is hereby incorporated by reference in its entirety.

When a requester 602 in network A 640a multicasts a service command, the multicast repeater 646a in network A 640a receives the service command and forwards it to the multicast repeater 646b in network B 640b via a connection (e.g., a TCP/IP connection) that has been established with the network B repeater 646b. The network B repeater 646b multicasts the service command on network B 640b, at which point it is received and responded to by the service 606 on the provider 614 in network B 640b.

Figure 7:
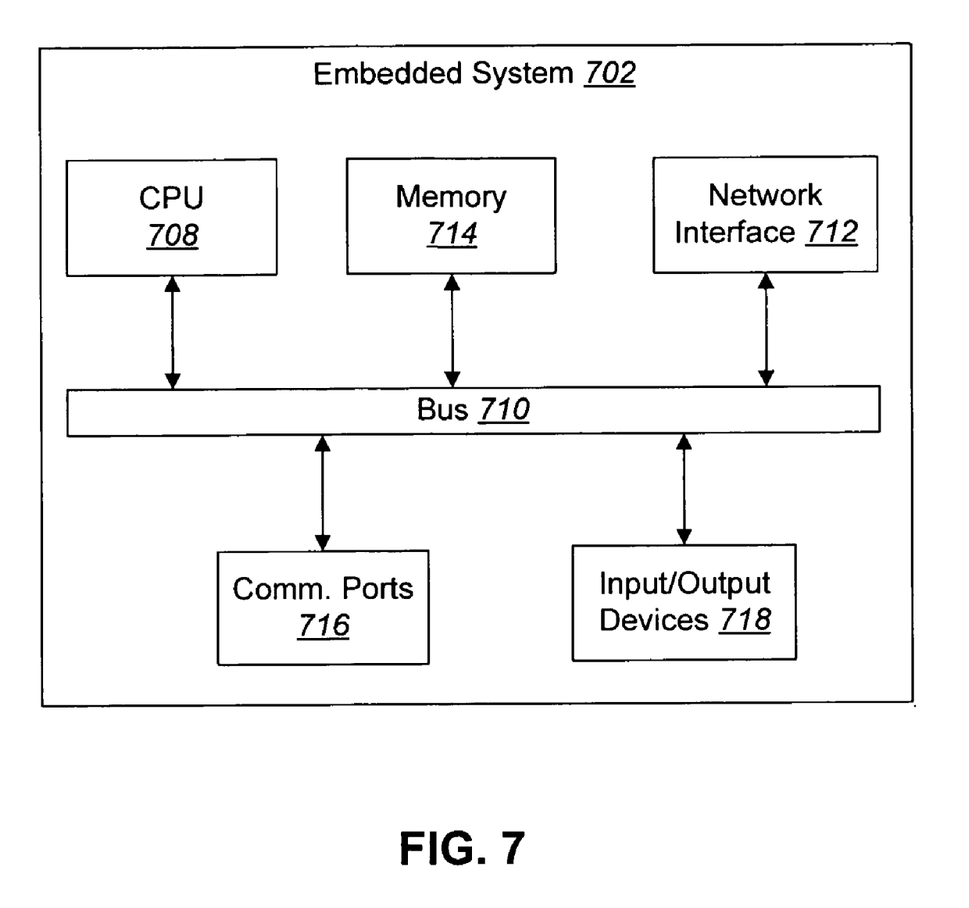
FIG. 7 is a block diagram of hardware components that may be used in an embedded system that is configured according to an embodiment.

As indicated above, the nodes within a network may include one or more embedded systems. The present systems and methods may be implemented in a computer network where an embedded system provides data and/or services to other computing devices. FIG. 7 is a block diagram of hardware components that may be used in an embedded system 702 that is configured according to an embodiment. A central processing unit (CPU) 708 or processor may be provided to control the operation of the embedded system 702, including the other components thereof, which are coupled to the CPU 708 via a bus 710. The CPU 708 may be embodied as a microprocessor, microcontroller, digital signal processor or other device known in the art. The CPU 708 performs logical and arithmetic operations based on program code stored within the memory. In certain embodiments, the memory 714 may be on-board memory included with the CPU 708. For example, microcontrollers often include a certain amount of on-board memory.

The embedded system 702 may also include a network interface 712. The network interface 712 allows the embedded system 702 to be connected to a network, which may be a pager network, a cellular network, a global communications network, the Internet, a computer network, a telephone network, etc. The network interface 712 operates according to standard protocols for the applicable network.

The embedded system 702 may also include memory 714. The memory 714 may include random access memory (RAM) for storing temporary data. Alternatively, or in addition, the memory 714 may include read-only memory (ROM) for storing more permanent data, such as fixed code and configuration data. The memory 714 may also be embodied as a magnetic storage device, such as a hard disk drive. The memory 714 may be any type of electronic device that is capable of storing electronic information.

The embedded system 702 may also include one or more communication ports 716, which facilitate communication with other devices. The embedded system 702 may also include input/output devices 718, such as a keyboard, a mouse, a joystick, a touchscreen, a monitor, speakers, a printer, etc.

Of course, FIG. 7 illustrates only one possible configuration of an embedded system 702. Various other architectures and components may be utilized.

Figure 8:
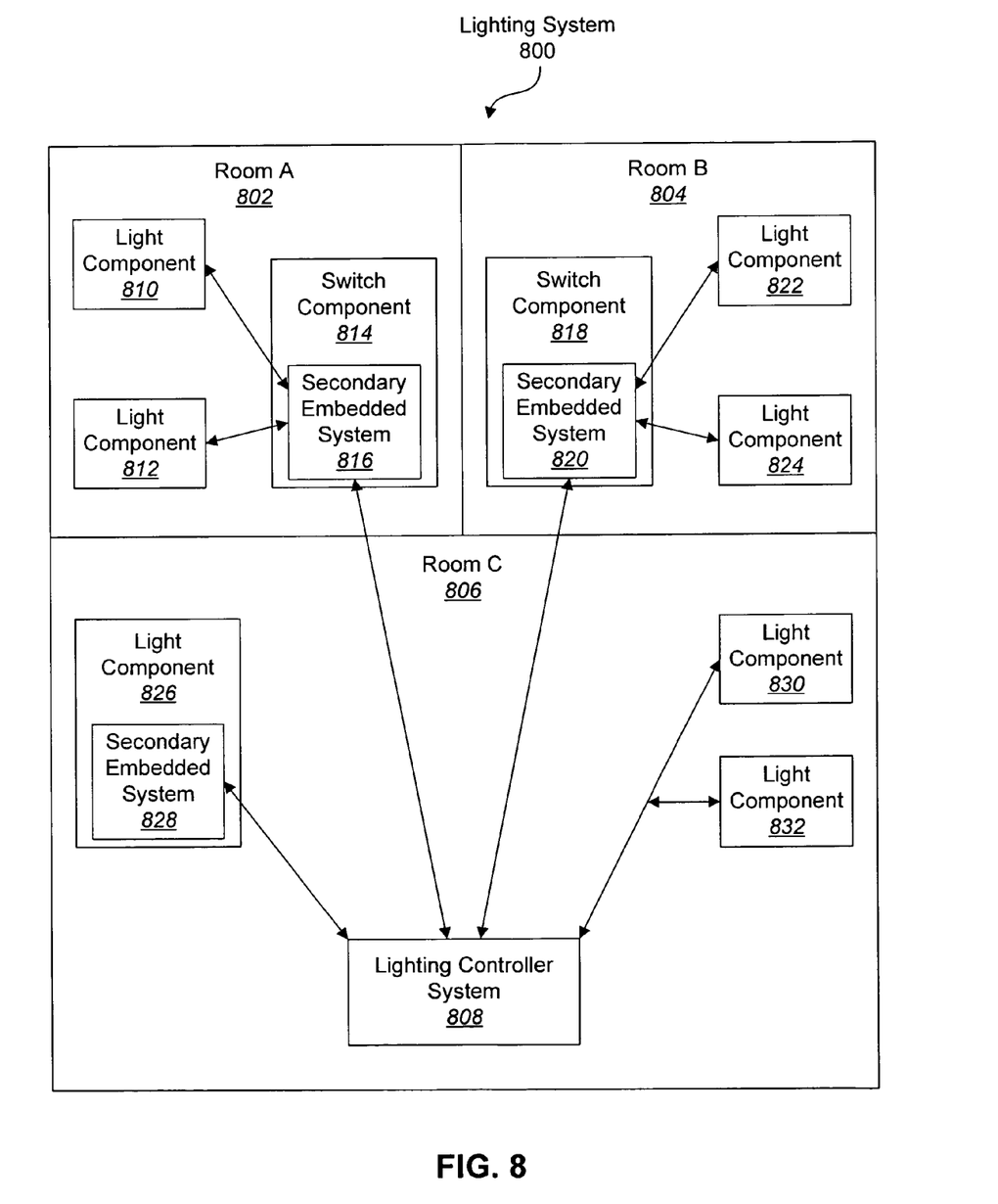
FIG. 8 illustrates an exemplary lighting system in which the present systems and methods may be implemented.

The present systems and methods may be used in several contexts. FIG. 8 illustrates one embodiment of a system wherein the present systems and methods may be implemented. FIG. 8 is a block diagram that illustrates one embodiment of a lighting system 800 that includes a lighting controller system 808. The lighting system 800 of FIG. 8 may be incorporated in various rooms in a home. As illustrated, the system 800 includes a room A 802, a room B 804, and a room C 806. Although three rooms are shown in FIG. 8, the system 800 may be implemented in any number and variety of rooms within a home, dwelling, or other environment.

The lighting controller system 808 may monitor and control additional embedded systems and components within the system 800. In one embodiment, the room A 802 and the room B 804 each include a switch component 814, 818. The switch components 814, 818 may also include a secondary embedded system 816, 820. The secondary embedded systems 816, 820 may receive instructions from the lighting controller system 808. The secondary embedded systems 816, 820 may then execute these instructions. The instructions may include powering on or powering off various light components 810, 812, 822, and 824. The instructions may also include dimming the brightness or increasing the brightness of the various light components 810, 812, 822, and 824. The instructions may further include arranging the brightness of the light components 810, 812, 822, and 824 in various patterns. The secondary embedded systems 816, 820 facilitate the lighting controller system 808 to monitor and control each light component 810, 812, 822, and 824 located in the room A 802 and the room B 804.

The lighting controller system 808 might also provide instructions directly to a light component 826 that includes a secondary embedded system 828 in the depicted room C 806. The lighting controller system 808 may instruct the secondary embedded system 828 to power down or power up the individual light component 826. Similarly, the instructions received from the lighting controller system 808 may include dimming the brightness or increasing the brightness of the individual light component 826.

The lighting controller system 808 may also monitor and provide instructions directly to individual light components 830 and 832 within the system 800. These instructions may include similar instructions as described previously.

Figure 9:
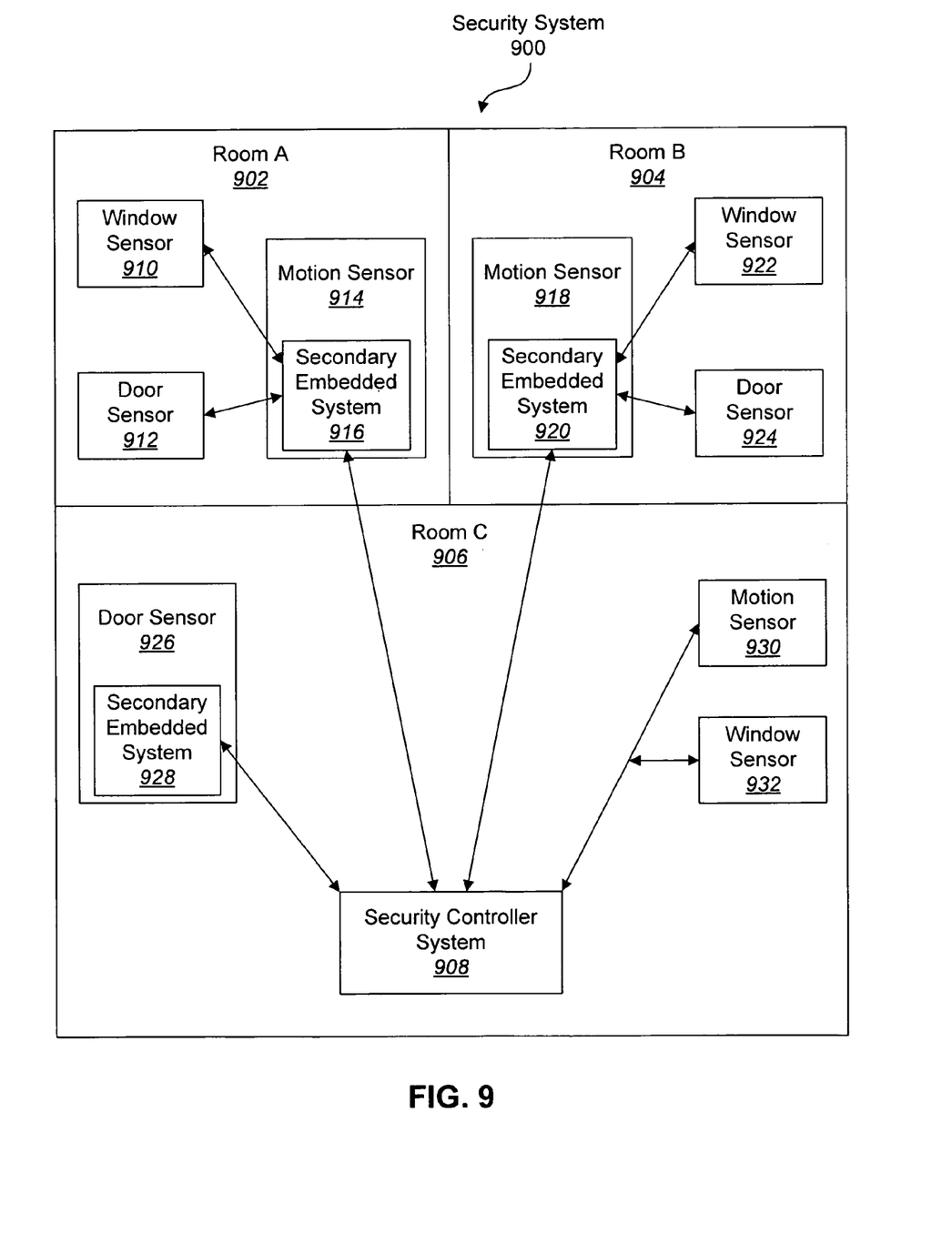
FIG. 9 illustrates an exemplary security system in which the present systems and methods may be implemented.

FIG. 9 is an additional embodiment of a system wherein the present systems and methods of the present invention may be implemented. FIG. 9 is a block diagram illustrating a security system 900. The security system 900 in the depicted embodiment is implemented in a room A 902, a room B 904, and a room C 906. These rooms may be in the confines of a home or other enclosed environment. The system 900 may also be implemented in an open environment where the rooms A, B and C, 902, 904, and 906 respectively represent territories or boundaries.

The system 900 includes a security controller system 908. The security controller system 908 monitors and receives information from the various components within the system 900. For example, a motion sensor 914, 918 may include a secondary embedded system 916. The motion sensors 914, 918 may monitor an immediate space for motion and alert the security controller system 908 when motion is detected via the secondary embedded system 916, 920. The security controller system 908 may also provide instructions to the various components within the system 900. For example, the security controller system 908 may provide instructions to the secondary embedded systems 916, 920 to power up or power down a window sensor 910, 922 and a door sensor 912, 924. In one embodiment, the secondary embedded systems 916, 920 notify the security controller system 908 when the window sensors 910, 922 detect movement of a window. Similarly, the secondary embedded systems 916, 920 notify the security controller system 908 when the door sensors 912, 924 detect movement of a door. The secondary embedded systems 916, 920 may instruct the motion sensors 914, 918 to activate the LED (not shown) located within the motion sensors 914, 918.

The security controller system 908 may also monitor and provide instructions directly to individual components within the system 900. For example, the security controller system 908 may monitor and provide instructions to power up or power down to a motion sensor 930 or a window sensor 932. The security controller system 908 may also instruct the motion sensor 930 and the window sensor 932 to activate the LED (not shown) or audio alert notifications within the sensors 930 and 932.

Each individual component comprising the system 900 may also include a secondary embedded system. For example, FIG. 9 illustrates a door sensor 926 including a secondary embedded system 928. The security controller system 908 may monitor and provide instructions to the secondary embedded system 928 in a similar manner as previously described.

Figure 10:
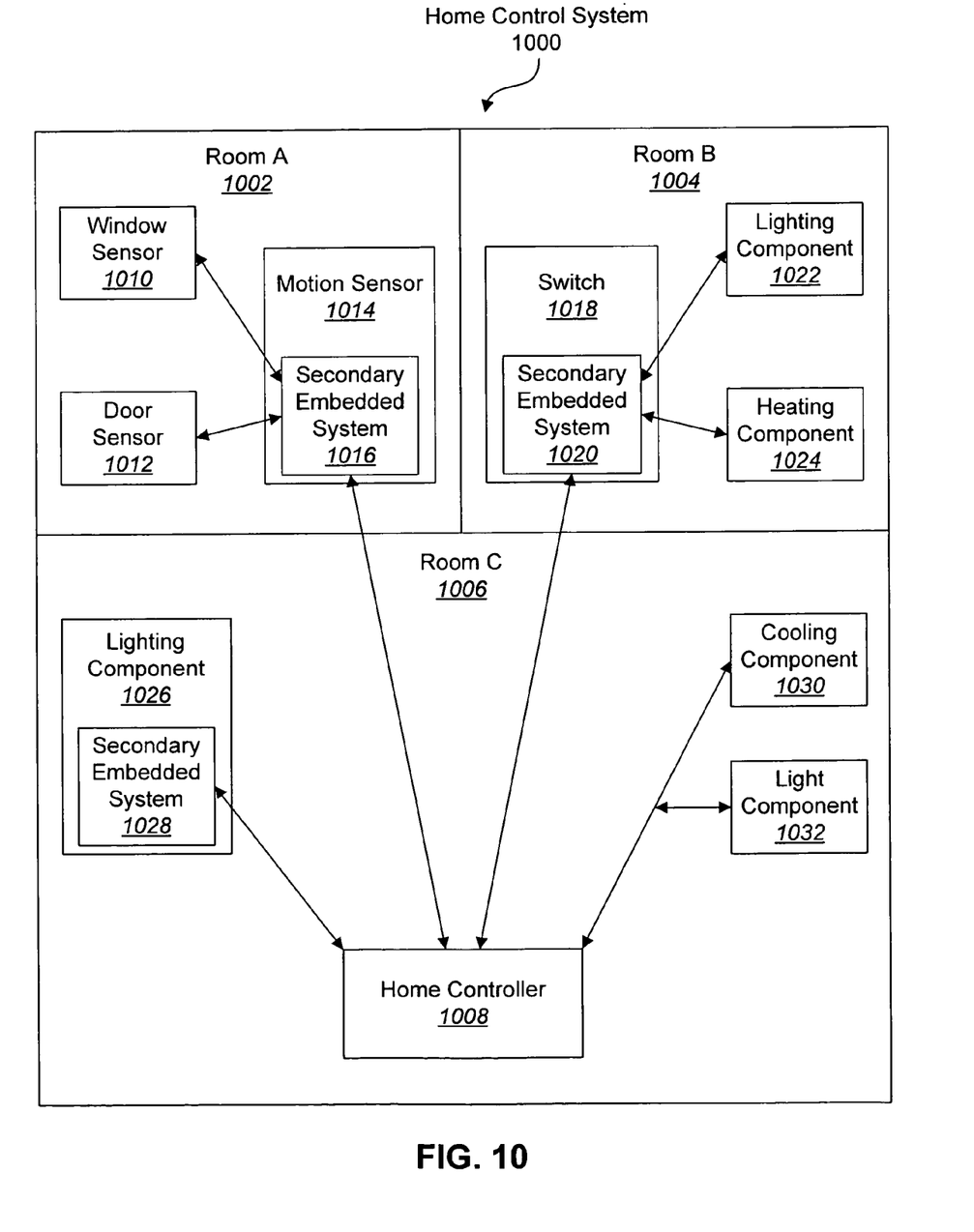
FIG. 10 illustrates an exemplary home controller system in which the present systems and methods may be implemented.

FIG. 10 is a block diagram illustrating one embodiment of a home control system 1000. The home control system 1000 includes a home controller 1008 that facilitates the monitoring of various systems such as the lighting system 800, the security system 900, and the like. The home control system 1000 allows a user to control various components and systems through one or more embedded systems. In one embodiment, the home controller system 1008 monitors and provides information in the same manner as previously described in relation to FIGS. 8 and 9. In the depicted embodiment, the home controller 1008 provides instructions to a heating component 1024 via a secondary embedded system 1020. The heating component 1024 may include a furnace or other heating device typically found in resident locations or offices. The home controller system 1008 may provide instructions to power up or power down the heating component 1024 via the secondary embedded system 1020.

Similarly, the home controller 1008 may monitor and provide instructions directly to a component within the home control system 1000 such as a cooling component 1030. The cooling component 1030 may include an air conditioner or other cooling device typically found in resident locations or offices. The central home controller 1008 may instruct the cooling component 1030 to power up or power down depending on the temperature reading collected by the central embedded system 1008. The home control system 1000 functions in a similar manner as previously described in relation to FIGS. 8 and 9.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for discovering and interacting with services, the method being implemented by a requestor, the method comprising:

multicasting a service command, wherein the service command comprises an instruction to a service to perform at least one operation other than providing discovery information;

receiving response data from at least one service in response to the service command, wherein the response data is generated as a result of the at least one operation being performed;

receiving discovery information in response to the service command, wherein the discovery information enables the requestor to interact with the at least one service, wherein the response data and the discovery information are received simultaneously by the requestor;

processing the response data; and processing the discovery information.

2. The method of claim 1, wherein the at least one service has not previously been discovered by the requestor.

3. The method of claim 1, further comprising using the discovery information to connect with the at least one service.

4. The method of claim 1, wherein the discovery information from a particular service comprises:

a network address of a provider of the service; and a port on the provider on which the service is available.

5. The method of claim 1, wherein the discovery information from a particular service is included within a transport header of a packet sent from the service.

6. The method of claim 1, wherein the response data from a particular service is included within a payload of a packet sent from the service.

7. The method of claim 1, wherein the service command is a call to a conditional function.

8. The method of claim 1, wherein the at least one service comprises a service that is located on a non-multicast provider.

9. The method of claim 1, wherein the at least one service comprises a service that is located on a provider in a network that is separated from the requestor's network by at least one networking device that is not configured to route multicast addressing.

10. The method of claim 1, wherein the multicasting of the service command is performed in accordance with a User Datagram Protocol implementation.

11. The method of claim 1, wherein the response data and the discovery information are received via unicast in accordance with a User Datagram Protocol implementation.

12. A computer system that is configured to discover and interact with services, the computer system comprising:
- a processor;
- memory in electronic communication with the processor;
- instructions stored in the memory, the instructions being executable to:
  - multicast a service command, wherein the service command comprises an instruction to a service to perform at least one operation other than providing discovery information;
  - receive response data from at least one service in response to the service command, wherein the response data is generated as a result of the at least one operation being performed;
  - receive discovery information in response to the service command, wherein the discovery information enables the requestor to interact with the at least one service, wherein the response data and the discovery information are received simultaneously by the computer system;
  - process the response data; and
  - process the discovery information.

13. The computer system of claim 12, wherein the at least one service has not previously been discovered by the requestor.

14. The computer system of claim 12, wherein the instructions are also executable to use the discovery information to connect with the at least one service.

15. A computer-readable medium comprising instructions that are executable to:
- multicast a service command, wherein the service command comprises an instruction to a service to perform at least one operation other than providing discovery information;
- receive response data from at least one service in response to the service command, wherein the response data is generated as a result of the at least one operation being performed;
- receive discovery information in response to the service command, wherein the discovery information enables the requestor to interact with the at least one service, wherein the response data and the discovery information are received simultaneously;
- process the response data; and
- process the discovery information.

16. The computer-readable medium of claim 15, wherein the at least one service has not previously been discovered by the requestor.

17. The computer-readable medium of claim 15, wherein the instructions are also executable to use the discovery information to connect with the at least one service.

* * * * *

UNITED STATES PATENT AND TRADEMARK OFFICE
CERTIFICATE OF CORRECTION

PATENT NO. : 7,330,882 B2  Page 1 of 1
APPLICATION NO. : 11/320498
DATED : February 12, 2008
INVENTOR(S) : Bryant Eastham It is certified that error appears in the above-identified patent and that said Letters Patent is hereby corrected as shown below:

In the Abstract, line 1, please replace "requester" with --requestor--.
In the Abstract, line 11, please replace "requester" with --requestor--.
In the column 3, line 3, please replace "requester" with --requestor--.
In the column 3, line 6, please replace "requester" with --requestor--.
In the column 4, line 19, please replace "requester" with --requestor--.
In the column 4, line 25, please replace "requester" with --requestor--.
In the column 5, line 41, please replace "requester" with --requestor--.
In the column 5, line 49, please replace "requester" with --requestor--.
In the column 6, line 16, please replace "requester" with --requestor--.
In the column 6, line 17, please replace "requester" with --requestor--.
In the column 6, line 44, please replace "requester" with --requestor--.
In the column 6, line 62, please replace "requester" with --requestor--.
In the column 7, line 16, please replace "requester" with --requestor--.
In the column 8, line 8, please replace "requester" with --requestor--.
In the column 8, line 47, please replace "requester" with --requestor--.
In the column 8, line 49, please replace "requester" with --requestor--.
In the column 9, line 41, please replace "requester" with --requestor--.
In the column 10, line 45, please replace "requester" with --requestor--.

Signed and Sealed this

Nineteenth Day of August, 2008

JON W. DUDAS
*Director of the United States Patent and Trademark Office*